United States Patent
Inaba

(10) Patent No.: US 11,703,008 B2
(45) Date of Patent: Jul. 18, 2023

(54) INJECTION CONTROL DEVICE

(71) Applicant: DENSO CORPORATION, Kariya (JP)

(72) Inventor: Masashi Inaba, Kariya (JP)

(73) Assignee: DENSO CORPORATION, Kariya (JP)

( * ) Notice: Subject to any disclaimer, the term of this patent is extended or adjusted under 35 U.S.C. 154(b) by 130 days.

(21) Appl. No.: 17/341,981

(22) Filed: Jun. 8, 2021

(65) Prior Publication Data

US 2021/0388791 A1    Dec. 16, 2021

(30) Foreign Application Priority Data

Jun. 10, 2020    (JP) ................. 2020-100927

(51) Int. Cl.
*F02D 41/20* (2006.01)
*F02D 41/22* (2006.01)

(52) U.S. Cl.
CPC ............ *F02D 41/20* (2013.01); *F02D 41/22* (2013.01); *F02D 2041/2006* (2013.01); *F02D 2041/2017* (2013.01); *F02D 2041/2048* (2013.01); *F02D 2041/2068* (2013.01)

(58) Field of Classification Search
CPC ............ F02D 41/20; F02D 2041/2006; F02D 2041/2017; F02D 2041/2048; F02D 2041/2068; F02D 2041/2003–2093
See application file for complete search history.

(56) References Cited

U.S. PATENT DOCUMENTS

| | | | |
|---|---|---|---|
| 8,011,351 B2 * | 9/2011 | Casasso | F02D 41/402 123/472 |
| 8,810,176 B2 * | 8/2014 | Kawakami | H02P 6/10 363/56.05 |
| 10,156,199 B2 * | 12/2018 | Nakano | F02D 41/2451 |
| 2017/0008521 A1 | 1/2017 | Braunstein et al. | |
| 2017/0008562 A1 | 1/2017 | Shashua et al. | |
| 2017/0010104 A1 | 1/2017 | Aviel | |
| 2017/0010105 A1 | 1/2017 | Gdalyahu et al. | |
| 2017/0010106 A1 | 1/2017 | Shashua et al. | |
| 2017/0010107 A1 | 1/2017 | Shashua et al. | |
| 2017/0010108 A1 | 1/2017 | Shashua | |

(Continued)

FOREIGN PATENT DOCUMENTS

JP    2011-247192 A    12/2011
WO    WO-2016194197 A1 *    12/2016

OTHER PUBLICATIONS

Sakamoto, JP 2011-247192, machine translation. (Year: 2011).*
Yamakawa, WO 2016/194197, machine translation. (Year: 2016).*

*Primary Examiner* — Hung Q Nguyen
*Assistant Examiner* — Mark L. Greene
(74) *Attorney, Agent, or Firm* — Posz Law Group, PLC

(57) ABSTRACT

An injection control device includes: a boost controller charging a boost capacitor by performing a boost switching control of a boost switch, and supplying a boost power from a battery power source; and a boost voltage monitor monitors a boost voltage. The boost controller measures a number of times of when the boost voltage becomes equal to or higher than a predetermined value due to a boost current flowing into the boost capacitor, causing a jump of the boost voltage during a time between a start and stop of boosting, and determines deterioration of the boost capacitor by comparing the measured number of times (i.e., the number of jumps) with a predetermined number of times.

14 Claims, 6 Drawing Sheets

(56) References Cited

U.S. PATENT DOCUMENTS

| | | |
|---|---|---|
| 2017/0010109 A1 | 1/2017 | Hayon et al. |
| 2017/0010115 A1 | 1/2017 | Stein et al. |
| 2017/0010120 A1 | 1/2017 | Shashua et al. |
| 2017/0010121 A1 | 1/2017 | Shashua et al. |
| 2017/0010124 A1 | 1/2017 | Reisman et al. |
| 2017/0010614 A1 | 1/2017 | Shashua et al. |
| 2017/0010616 A1 | 1/2017 | Shashua et al. |
| 2017/0010617 A1 | 1/2017 | Shashua et al. |
| 2017/0010618 A1 | 1/2017 | Shashua et al. |
| 2017/0031359 A1 | 2/2017 | Shashua et al. |
| 2017/0248960 A1 | 8/2017 | Shashua et al. |
| 2017/0336792 A1 | 11/2017 | Gdalyahu et al. |
| 2017/0336793 A1 | 11/2017 | Shashua et al. |
| 2017/0336794 A1 | 11/2017 | Shashua et al. |
| 2017/0336801 A1 | 11/2017 | Shashua et al. |
| 2017/0364082 A1 | 12/2017 | Taieb et al. |
| 2018/0217600 A1 | 8/2018 | Shashua et al. |
| 2019/0384294 A1 | 12/2019 | Shashua et al. |
| 2019/0384295 A1 | 12/2019 | Shashua et al. |
| 2019/0384296 A1 | 12/2019 | Shashua et al. |
| 2020/0064843 A1 | 2/2020 | Shashua et al. |
| 2020/0064844 A1 | 2/2020 | Shashua et al. |
| 2020/0073388 A1 | 3/2020 | Shashua et al. |
| 2020/0201330 A1 | 6/2020 | Shashua et al. |

* cited by examiner

INJECTION CONTROL DEVICE

CROSS REFERENCE TO RELATED APPLICATION

The present application is based on and claims the benefit of priority of Japanese Patent Application No. 2020-100927, filed on Jun. 10, 2020, the disclosure of which is incorporated herein by reference.

TECHNICAL FIELD

The present disclosure generally relates to an injection control device.

BACKGROUND INFORMATION

The injection control device charges a boost capacitor by performing a boost switching control of a boost switch, and supplies a boost power from a battery power source. A configuration in which an aluminum electrolytic capacitor is used as the boost capacitor is considered. The aluminum electrolytic capacitor has the characteristic that the electrolytic solution decreases as deterioration progresses due to deterioration over time, for example.

SUMMARY

It is an object of the present disclosure to provide an injection control device capable of appropriately determining deterioration of a boost capacitor.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
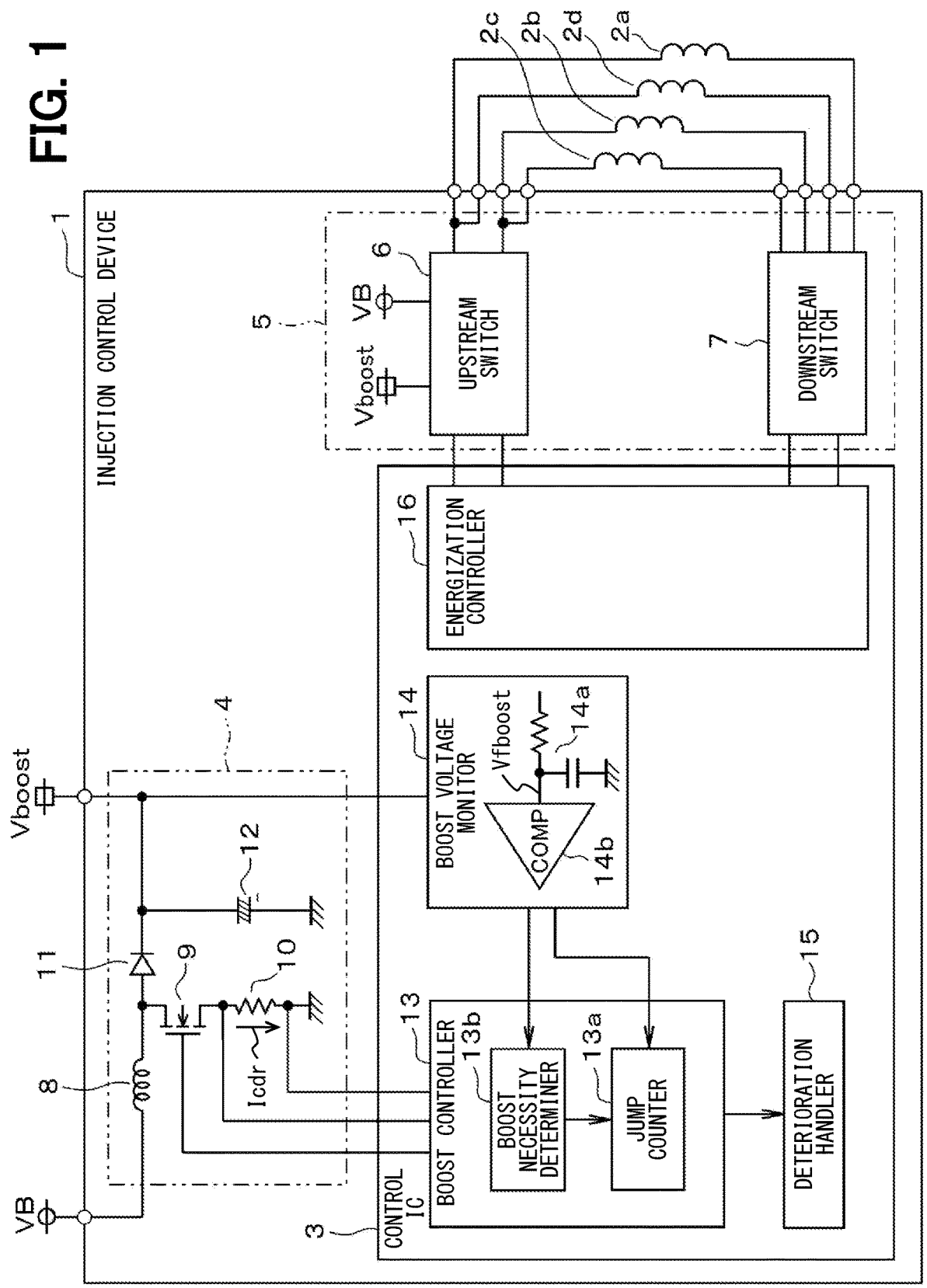
FIG. 1 is a functional block diagram showing a configuration according to a first embodiment.

Hereinafter, embodiments of the present disclosure are described with reference to drawings. In the embodiments, elements corresponding to those which have been described in the preceding embodiment are denoted by the same reference numerals, and redundant description may be omitted. (First embodiment)

First Embodiment

The first embodiment of the present disclosure is described with reference to FIG. 1 to FIG. 5. As shown in FIG. 1, an injection control device 1 is a device that controls the driving of solenoid-type fuel injection valves 2a to 2d, which are configured to inject fuel into an internal combustion engine mounted on a vehicle such as an automobile. The injection control device 1 is implemented as an electronic control unit (ECU). The fuel injection valve 2a and the fuel injection valve 2d are arranged in cylinders having opposite phases. As such, the injection of the fuel injection valve 2a and the injection of the fuel injection valve 2d do not overlap with each other. The fuel injection valve 2b and the fuel injection valve 2c are arranged in cylinders having opposite phases. As such, the injection of the fuel injection valve 2b and the injection of the fuel injection valve 2c do not overlap with each other. In other words, (A) the injection of the fuel injection valve 2a and the injection of the fuel injection valve 2d and (B) the injection of the fuel injection valve 2b and the injection of the fuel injection valve 2c are in an overlapping relationship with each other. As shown in FIG. 1, valves with non-overlap (such as valves 2a and 2d) may share upstream switches if the downstream switches are individual (or the reverse). In the present embodiment, a configuration of four cylinders with four fuel injection valves 2a to 2d is illustrated. However, any number of cylinders may be used, and the configuration can be applied to six cylinders, eight cylinders and the like, for example.

The injection control device 1 includes a control IC 3, a boost circuit 4, and a drive circuit 5. The control IC 3 may be, for example, an integrated circuit device using an ASIC. The control IC 3 includes, for example, a controller such as a CPU or a logic circuit, a storage such as a RAM, a ROM, or an EEPROM, and comparators. The control IC 3 is configured to perform various control processes based on hardware and software. When a sensor signal is input from an external sensor (not shown), the control IC 3 calculates an injection instruction timing, and drives the drive circuit 5 according to the calculated injection instruction timing.

The drive circuit 5 includes upstream switches 6 and downstream switches 7. The upstream switch 6 is a switch provided on an upstream side of the fuel injection valves 2a to 2d, and includes a peak current drive switch for turning ON/OFF of discharge of a boost power supply Vboost to the fuel injection valves 2a to 2d, and a battery voltage drive switch for performing constant current control using a battery power supply VB. The boost power supply Vboost is, for example, 65 volts, and the battery power supply VB is, for example, 12 volts. The peak current drive switch and the battery voltage drive switch may, for example, be implemented as an n-channel type MOS transistor, but other types of transistors such as bipolar transistors may be used as well. The downstream switches 7 include individual switches provided on respective downstream sides of the fuel injection valves 2a to 2d. The upstream switches are not shown individually. These upstream switches include: peak current drive switches known as "discharge switches" and include battery voltage drive switches knowns as constant current switches), the downstream switches may be implemented as an n-channel type MOS transistor, but other types of transistors such as bipolar transistors may be used as well.

The drive circuit 5 is driven by switching control of the upstream switches 6 and the downstream switches 7 according to an energization current profile by an energization controller 16 described later. When driven, the drive circuit 5 controls the opening and closing of the fuel injection valves 2a to 2d by performing peak current drive (also known as boost voltage drive) and constant current drive of the fuel injection valves 2a to 2d, and controls the injection of fuel into the internal combustion engine from the fuel injection valves 2a to 2d.

The boost circuit 4 is implemented as a DC/DC converter with a chopper circuit, which includes, for example, a boost coil 8 composed of an inductor, a boost switch 9 composed of, for example, a MOS transistor, a current detection resistor 10, a boost diode 11, and a boost capacitor 12 in the illustrated form. The specific structure of the boost circuit 4 is not limited to the illustrated form, and various structures can also be used. In the boost circuit 4, according to switching of the boost switch 9 under boost switching control of the boost controller 13, which will be described later, energy of the electric current stored in the boost coil 8 is rectified by the boost diode 11, and the rectified current energy is stored in the boost capacitor 12 for charging the boost capacitor 12, and the battery power supply VB is used to supply power to the boost circuit 4 that is generating the boosted voltage VBoost. An aluminum electrolytic capacitor is used as the boost capacitor 12.

The control IC 3 includes a boost controller 13, a boost voltage monitor 14, a deterioration handler 15, and an energization controller 16. The functions provided by the control IC 3 can be provided by (a) a combination of software stored in non-transitory memory, and a computer that executes the software, (b) software only, (c) hardware only, or (d) a combination thereof ((a), (b), and (c)).

Figure 2:
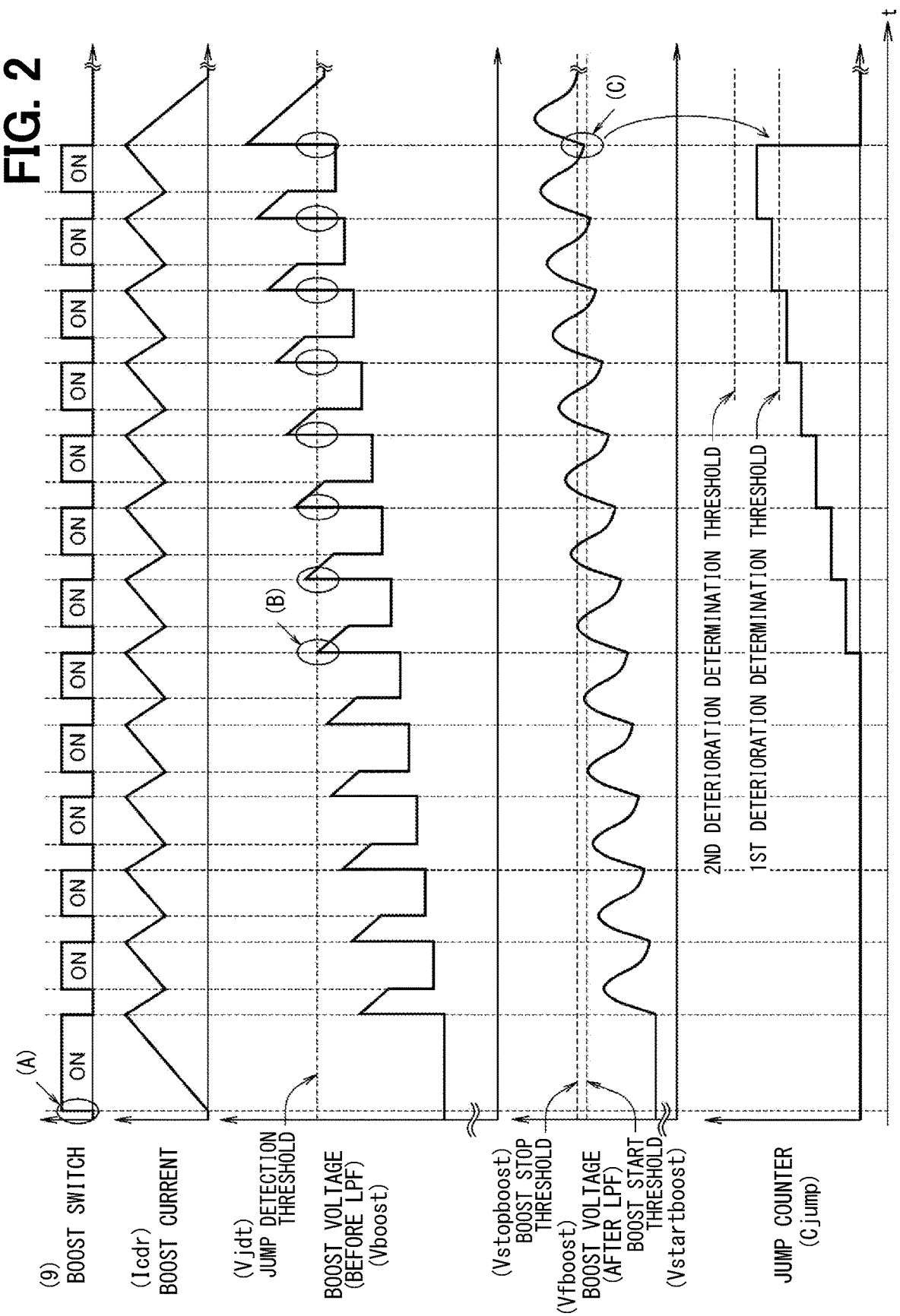
FIG. 2 is a timing chart showing an operation sequence for determining deterioration of a boost capacitor.
Figure 3:
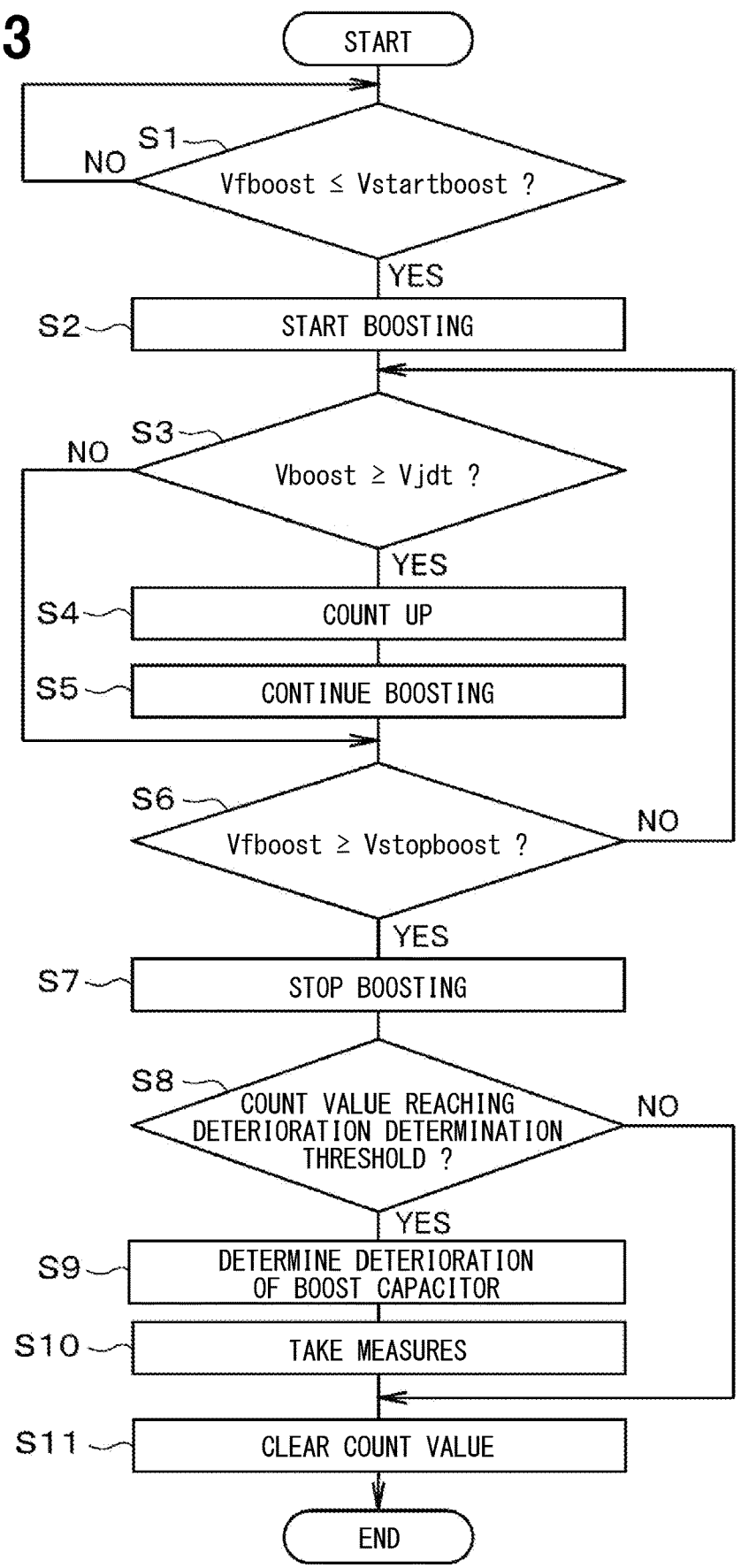
FIG. 3 is a flowchart of operation of an injection control device.

The boost controller 13 detects the current Icdr flowing through the current detection resistor 10, determines whether boosting is necessary or not by a boost necessity determiner 13b, and, upon determining that boosting is necessary when the a filtered boost voltage Vfboost is equal to or lower than (or simply lower than) the boost start threshold value Vstartboost, starts the boost switching control by the boost switch 9 to start boosting (see (A) in FIG. 2).

In other words, boosting (by pulsing the boost switch 9) begins when Vstartboost>Vfboost. See monitor 14 in FIG. 5, and step S1 in FIG. 3.

When the boost current (Icdr from the boost coil 8) flows into the boost capacitor 12 due to the start of boosting, the boost voltage Vboost jumps up by about 10 V due to ESR (Equivalent Series Resistance), which is a DC resistance component of the aluminum electrolytic capacitor (see (B) in FIG. 2).

The boost voltage monitor 14 detects the boost voltage Vboost between an anode and a ground of the boost capacitor 12, and monitors this boost voltage. The boost voltage monitor 14 compares the boost voltage Vboost (before passing through a low-pass filter 14a to generate the filtered boost voltage Vfboost) with a preset jump detection threshold value Vjdt. When the boost voltage Vboost before passing through the low-pass filter 14a becomes equal to or higher than (or simply higher than) the jump detection threshold value Vjdt, the boost voltage monitor 14 switches an output to a jump counter 13a of the boost controller 13 from OFF to ON, and after a certain period of time from such switching, switches an output to the jump counter 13a from ON to OFF.

In one embodiment, if Vboost>Vjdt when the boost switch is turned OFF (which causes Vboost to jump), then the jump counter (Cjump) is incremented.

Figure 5:
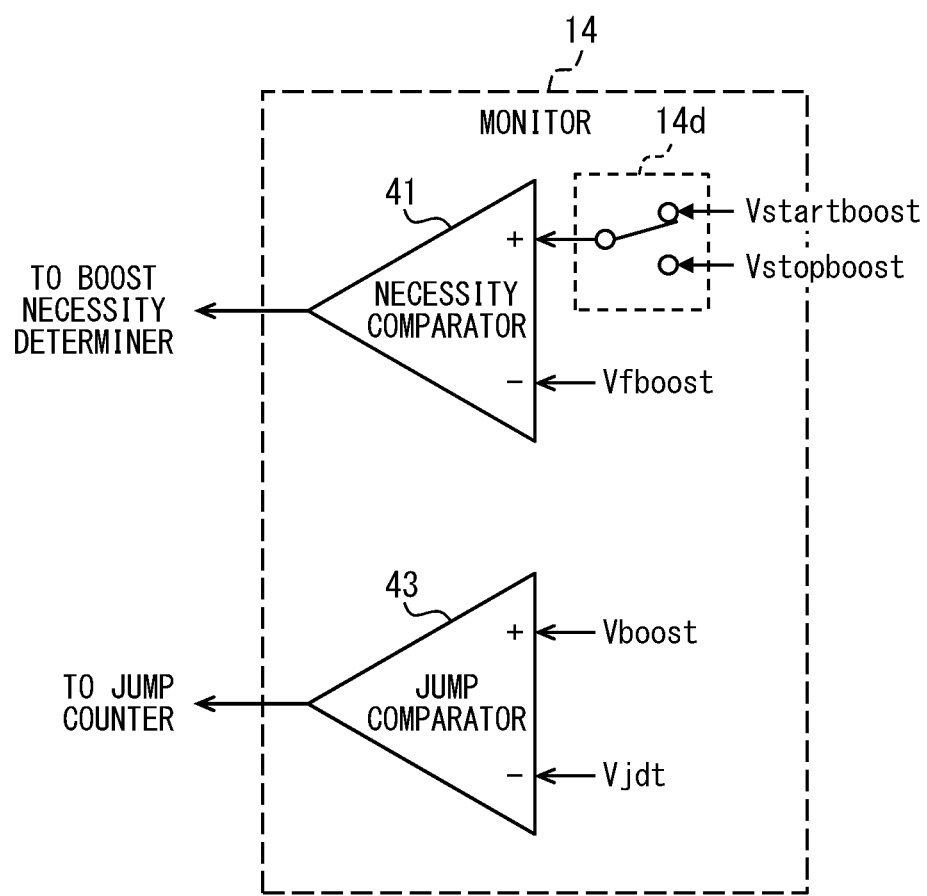
FIG. 5 is a monitor including a necessity comparator and a jump comparator.

Further, the boost voltage monitor 14 compares the boost voltage after passing through the low-pass filter 14a (Vfboost) with a preset boost stop threshold value (Vstopboost) and/or a boost start threshold value (Vstartboost) by using a comparison circuit 14b, and when the boost voltage after passing through the low-pass filter 14a (Vfboost) becomes equal to or higher than (or simply higher than) the boost stop threshold value, the boost voltage monitor 14 switches an output of the boost controller 13 to the boost necessity determiner 13b from OFF to ON, and then boost is necessary. Also see FIG. 5 including a necessity comparator 41 and a jump comparator 43. In FIG. 5, a switch 14d selects between Vstartboost and Vstopboost, for comparison against Vfboost.

The output to the determination unit boost necessity determiner 13b is switched from OFF to ON. The jump detection threshold value is different from the boost stop threshold value and the boost start threshold value. The boost controller 13 counts up a count value each time an input from the boost voltage monitor 14 to the jump counter 13a is switched from OFF to ON. The boost controller 13 holds a first deterioration determination threshold value and a second deterioration determination threshold value having a value greater than the first deterioration determination threshold value. The boost controller 13 compares the count value of the jump counter 13a with the first deterioration determination threshold value and the second deterioration determination threshold value to determine the deterioration of the boost capacitor 12, and outputs a determination result to the deterioration handler 15.

The deterioration handler 15, upon determining that the count value of the jump counter 13a has reached the first deterioration determination threshold value based on the determination result input from the boost controller 13, outputs, for example, a repair/replacement signal that indicates that the injection control device 1 needs to be repaired or replaced, or lowers the boost current, or increases an injection interval of the fuel injection valves 2a to 2d, or changes an upper limit of the number of stages during multi-stage injection. The deterioration handler 15 may perform only a part of the above-mentioned treatments or all of them. When the deterioration handler 15 determines that the count value of the jump counter 13a has reached the second deterioration determination threshold value based on the determination result input from the boost controller 13, the deterioration handler 15 changes an upper limit constraint of the engine speed (i.e., engine rotation number). Further, when the count value of the jump counter 13a reaches the first deterioration determination threshold value or the second deterioration determination threshold value, the boost controller 13 may change the first deterioration determination threshold value or the second deterioration determination threshold value.

The boost controller 13 determines that boosting is necessary when the input from the boost voltage monitor 14 to the boost necessity determiner 13b is switched from OFF to ON, and then the input from the boost voltage monitor 14 to the boost necessity determiner 13b is switched from ON to OFF, that is, when it is determined that the boost voltage is less than the boost stop threshold value.

Also, the boost controller 13 determines that boosting is not necessary when input from the boost voltage monitor 14 to the boost necessity determiner 13b is not switched from ON to OFF while the input to the boost necessity determiner 13b is continuously being turned ON for a certain period of time, that is, when the boost voltage is equal to or higher than the boost stop threshold value, and the count value of the jump counter 13a is cleared. (See (C) in FIG. 2).

Figure 6:
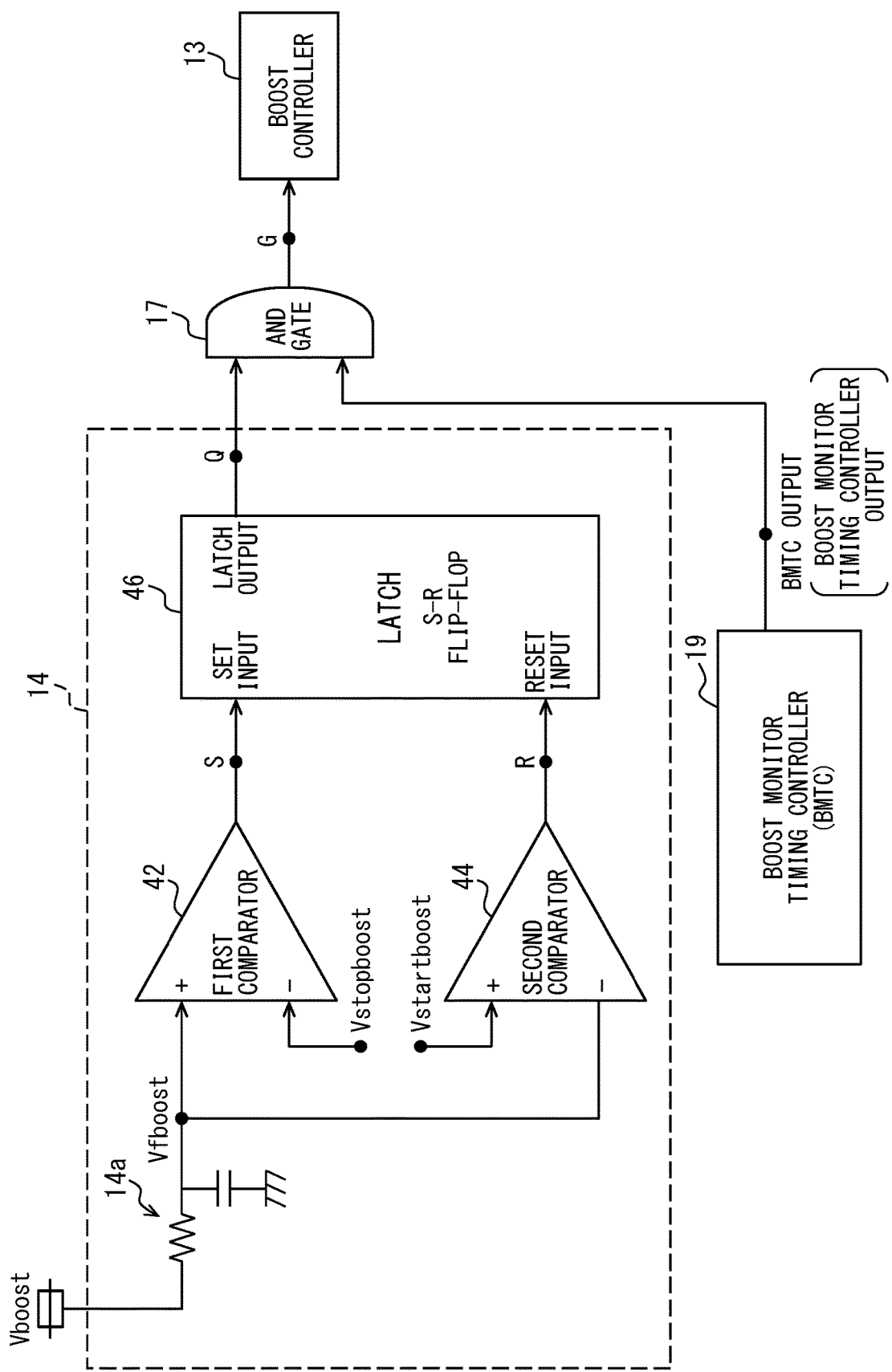
FIG. 6 is an alternative boost voltage monitor.

In one embodiment (see FIG. 6), the boost voltage monitor 14 may include two comparators (42 and 44) and a latch 46. A latch may be set when Vfboost>Vstopboost, and reset when Vstartboost>Vfboost. A latch output Q may be a first input into an AND gate 17, and a boost monitor timing controller 19 may be a second input into the AND gate 17. When the latch output is ON, and the boost monitor timing controller turns OFF, then boosting may stop. The boost monitor timing controller may turn OFF when the boost switch 9 turns OFF. The latch 46 may have an additional latch output (not shown) that is an inverse of the latch output Q. Slightly different logical combinations may yield an identical logical result going to the boost controller 13.

An operation of the injection control device 1 in the configuration described above is explained next with reference to FIG. 3. The control IC 3 monitors, at a predetermined cycle, an occurrence of a start event of a boost monitor process, and when the control IC 3 detects an occurrence of the start event of the boost monitor process, the control IC 3 starts the boost monitor process. When the control IC 3 starts the boost monitor process, the boost voltage after passing through the low-pass filter 14a is compared with the boost start threshold value, for a determination whether or not the boost voltage after passing through the low-pass filter 14a is equal to or lower than the boost start threshold value (S1). When the control IC 3 determines that the boost voltage after passing through the low-pass filter 14a Vfboost is equal to or lower than the boost start threshold value Vstartboost (S1: YES), the control IC 3 starts boost switching control and starts boosting (S2).

The control IC 3 compares the boost voltage before passing through the low-pass filter 14a Vboost with the jump detection threshold value Vjdt, and determines whether Vboost>Vjdt (S3). Alternatively, the test may be whether Vboost≥Vjdt. When the control IC 3 determines that Vboost>Vjdt (S3: YES), the control IC 3 counts up the count value of the jump counter 13a (S4), and continues the boost switching control for continuing boosting (S5).

In step S6, the control IC 3 compares the boost voltage after passing through the low-pass filter 14a Vfboost with the boost stop threshold value Vstopboost, and determines whether Vfboost>Vstopboost. Alternatively, the test may be whether Vfboost>Vstopboost. When the control IC 3 determines that Vfboost<Vstopboost (S6: NO), the control IC 3 returns the process to step S3, and repeats steps S3 and subsequent steps. When the control IC 3 determines that the boost voltage is equal to or higher than the boost stop threshold value (S6: YES), the control IC 3 stops the boost switching control and stops boosting (S7), and compares the count value of the jump counter 13a with the deterioration determination threshold value. (S8).

When the control IC 3 determines that the count value of the jump counter 13a has reached the deterioration determination threshold value (S8: YES), the control IC 3 determines the deterioration of the boost capacitor 12 (S9), and takes measures according to the degree of the deterioration (S10). That is, when the control IC 3 determines that the count value of the jump counter 13a has reached the first deterioration determination threshold value, the control IC 3 outputs a repair/replacement signal indicating that the injection control device 1 needs to be repaired/replaced, or lowers the boost current, or increases the injection interval of the fuel injection valves 2a to 2d, or changes the upper limit of the number of stages of multi-stage injection.

Additionally, when the control IC 3 further determines that the count value of the jump counter 13a has reached the second deterioration determination threshold value, the control IC 3 may take more serious actions such as changing the upper limit constraint of the engine speed (i.e., engine rotation number). The control IC 3 clears the count value of the jump counter 13a (S11), ends the boost monitor process, and waits for an occurrence of the next boost monitor process start event. Additionally, error signals may be sent when the first and/or the second determination thresholds are reached or crossed.

According to the first embodiment, the following effects can be exhibited. In the configuration in which the aluminum electrolytic capacitor is used as the boost capacitor 12 in the injection control device 1, the boost voltage jumps up due to the ESR which is the DC resistance component of the aluminum electrolytic capacitor. Thus, taking advantage of such characteristics and by counting the number of voltage jumps equal to or higher above than the jump detection threshold value, the deterioration and the degree thereof of the boost capacitor 12 is determined by comparing the number of jumps with the deterioration determination threshold value of the boost capacitor 12. In such manner, unlike the conventional configuration in which the leakage current is detected to determine the deterioration of the boost capacitor 12, the deterioration of the boost capacitor 12 can be determined even before the electrolytic solution of the capacitor 12 starts to decrease, that is, deterioration of the capacitor 12 is determinable when the composition of the electrolytic solution of the capacitor 12 has changed. As a result, the deterioration of the boost capacitor 12 can be appropriately determinable before the self-healing function is lost.

In the above-described determination scheme, the jumped-up boost voltage is compared with the jump detection threshold value, and the count value of the jumping counter 13a is compared with the deterioration determination threshold value, and the deterioration of the boost capacitor 12 is determined by the combination of the jump detection threshold value and the deterioration determination threshold value. Note that these threshold values may be calculated based on the ESR characteristics (i.e., initial characteristics, aging deterioration characteristics, temperature characteristics and the like) of the boost capacitor 12 and the boost current. In general, aluminum electrolytic capacitors deteriorate in high temperature and high humidity conditions, and their ESR characteristics tend to deteriorate when used at extremely low temperatures (−30° C., etc.), which leads to an increase of their resistance values. Therefore, the threshold value may be designed according to the deterioration curve having above dependencies.

In the injection control device 1, the jump detection threshold value for detecting the jump of the boost voltage is set to a threshold value different from the boost stop threshold value for determining the stop timing of boosting. The detection of the boost voltage jump and the determination of the boost stop timing can be performed by different threshold values.

When the count value of the jump counter 13a reaches the first deterioration determination threshold value in the injection control device 1, a repair/replacement signal indicating that the injection control device 1 needs to be repaired/replaced is output, or the boost current is reduced/lowered, or the injection interval of the fuel injection valves 2a to 2d is increased, or the upper limit of the number of stages of multi-stage injection is changed. In other words, when the count value of the jump counter 13a reaches the first deterioration determination threshold value, the following measures/treatment may be triggered: that is, a repair/replacement signal indicating that the injection control device 1 needs to be repaired/replaced is output, or the boost current is reduced, or fuel is used, or the injection interval of the injection valves 2a to 2d is increased, or the upper limit of the number of stages of multi-stage injection is changed.

The injection control device 1 is, when the count value of the jump counter 13a reaches the second deterioration determination threshold value, configured to change the upper limit constraint of the engine speed (i.e., engine rotation number). In other words, when the count value of the jump counter 13a reaches the second deterioration determination threshold value, the following measure such as changing the upper limit constraint of the engine speed may be triggered.

As described above, when the count value of the jump counter 13a of the injection control device 1 reaches the first deterioration determination threshold value or the second deterioration determination threshold value, the first deterioration determination threshold value or the second deterioration determination threshold value is changed. That is, by changing the first deterioration determination threshold value and the second deterioration determination threshold value to smaller values, subsequent determination(s) of the deterioration of the boost capacitor 12 may more severely be performable, and by changing the first deterioration determination threshold value and the second deterioration determination threshold value to greater values, subsequent determination(s) of the deterioration of the boost capacitor 12 may more loosely/laxly be performable.

Figure 4:
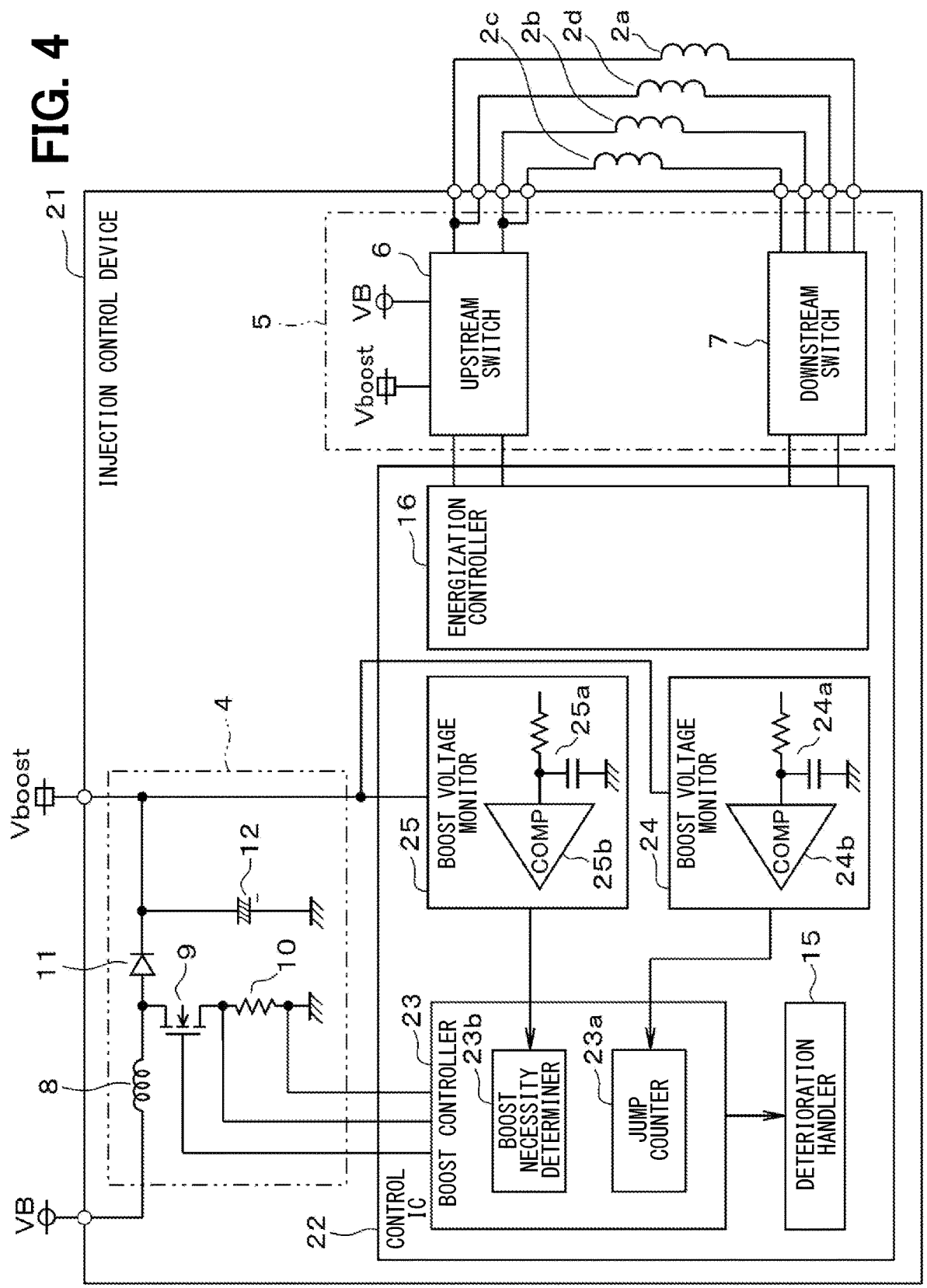
FIG. 4 is a functional block diagram showing a second embodiment.

Second Embodiment, FIG. 4

The second embodiment is described with reference to FIG. 4. In the second embodiment, a boost voltage monitor for monitoring the boost voltage, for the measurement of the number of times the boost voltage jumps up and a boost voltage monitor for monitoring the boost voltage, for the determination of the necessity of boosting are separately provided, which is a difference of the present embodiment from the first embodiment. In FIG. 2, the voltage before a low pass filter Vboost is used for comparison against the jump detection threshold Vjdt. However, a slightly filtered boost voltage may be used for determining the jump voltage. Such a slightly filtered boost voltage would have a shape between the Vboost and Vfboost in FIG. 2.

In an injection control device 21, a control IC 22 includes a boost controller 23, a first boost voltage monitor 24, a second boost voltage monitor 25, the deterioration handler 15, and the energization controller 16 are provided. The first boost voltage monitor 24 detects the voltage between the anode and the ground of the boost capacitor 12, and monitors the boost voltage. The first boost voltage monitor 24 compares the boost voltage after passing through a low-pass filter 24a with a preset jump detection threshold value by using a comparison circuit 24b. When the boost voltage after passing through the low-pass filter 24a exceeds (i.e., becomes equal to or higher than) the jump detection threshold value, the first boost voltage monitor 24 switches the output of the boost controller 23 to the jump counter 23a from OFF to ON, and after a certain period of time from such switching, switches the output to the counter 23a from ON to OFF.

Alternatively, in FIG. 5 the boost voltage before passing through a filter Vboost is compared in a jump comparator 43 against the preset jump detection value Vjdt.

The second boost voltage monitor 25 detects the voltage between the anode and the ground of the boost capacitor 12, and monitors the boost voltage. The second boost voltage monitor 25 compares the boost voltage after passing through a low-pass filter 25a with the preset boost stop threshold value and boost start threshold value by using a comparison circuit 25b. When the boost voltage after passing through the low-pass filter 25a becomes equal to or higher than the boost stop threshold value, the second boost voltage monitor 25 switches the output of the boost controller 23 to the boost necessity determiner 23b from OFF to ON, and thereafter switches the output to the boost necessity determiner 23b from OFF to ON when the boost voltage after passing through the low-pass filter 25a becomes equal to or lower than the boost start threshold value. The time constant of the low-pass filter 24a of the first boost voltage monitor 24 is different from the time constant of the low-pass filter 25a of the second boost voltage monitor 25.

According to the second embodiment, the following effects can be exhibited/achieved. In the injection control device 21, the same effects as those in the first embodiment can be achievable, that is, the deterioration of the boost capacitor 12 can be appropriately determinable before the self-healing function is lost.

In the injection control device 21, the time constant of the low-pass filter 24a of the first boost voltage monitor 24 that monitors the boost voltage for measuring (i.e., counting) the number of times the boost voltage jumps up and the time constant of the low-pass filter 25a of the second boost voltage monitor 25 for monitoring the boost voltage for a determination of the necessity of boosting are set to respectively different values. In the application/device for monitoring the boost voltage for a determination of the necessity of boosting, it may be necessary to set the time constant of the low-pass filter 24a to a relatively large value in order to avoid the influence of noise, while, in the application/device for monitoring the boost voltage for a measurement of the number of times the boost voltage jumps up, it may be not necessary to set the time constant of the low-pass filter 25a to a relatively large value. Therefore, by setting the time constants in the low-pass filters 24a and 25a to respectively different values, two different purposes of monitoring, i.e., monitoring of the boost voltage for the determination of necessity of boosting and monitoring of the boost voltage for counting the number of voltage jumps, are appropriately performable without compromise.

Other Embodiments

Although the present disclosure has been described in accordance with the examples (i.e., embodiments), it is understood that the present disclosure is not limited to such examples or structures. The present disclosure incorporates various modifications and variations within the scope of equivalents. Additionally, various combinations and configurations, as well as other combinations and configurations including one or more elements, or less than one element are also within the scope and spirit of the present disclosure.

What is claimed is:

1. An injection control device comprising:
   a boost controller configured to charge a boost capacitor by performing a boost switching control of a boost switch, and supplying a boost power from a battery power source; and
   a boost voltage monitoring circuit configured to monitor a boost voltage, wherein
   the boost controller (i) is configured to measure, as a measured number of times, a number of times of when the boost voltage becomes equal to or higher than a predetermined value due to a boosting current flowing into the boost capacitor, causing a jump up of the boost voltage during a time between a start and stop of boosting, and (ii) is configured to determine deterioration of the boost capacitor by comparing the measured number of times with a predetermined number of times.

2. The injection control device of claim 1, wherein the boost voltage monitoring circuit includes:
a first boost voltage monitoring circuit configured to monitor the boost voltage for a measurement of the number of times of when the boost voltage jumps up due to a flow of the boost current into the boost capacitor, and
a second boost voltage monitoring circuit configured to monitor the boost voltage for a determination of whether boosting is necessary, and
wherein a time constant of a low-pass filter of the first boost voltage monitoring circuit and a time constant of a low-pass filter of the second boost voltage monitoring circuit are different.

3. The injection control device of claim 1, wherein the boost controller sets the predetermined value to a value different from a boost stop threshold value for stopping boosting.

4. The injection control device of claim 1, wherein
the boost controller compares the measured number of times with the predetermined number of times to determine deterioration of the boost capacitor when boosting is stopped.

5. The injection control device of claim 1 further comprising:
a control integrated circuit comprising the boost controller and the boost voltage monitoring circuit;
wherein the control integrated circuit is configured to output a signal indicating a need for repair or replacement when the boost controller determines that the boost capacitor has deteriorated.

6. The injection control device of claim 1 further comprising:
a control integrated circuit comprising the boost controller and the boost voltage monitoring circuit:
wherein the control integrated circuit is configured to lower a peak boost current when the boost controller determines that the boost capacitor has deteriorated.

7. The injection control device of claim 1 further comprising:
a control integrated circuit comprising the boost controller and the boost voltage monitoring circuit:
wherein the control integrated circuit is configured to increase an injection interval of a fuel injection valve when the boost controller determines that the boost capacitor has deteriorated.

8. The injection control device of claim 1 further comprising:
a control integrated circuit comprising the boost controller and the boost voltage monitoring circuit:
wherein the control integrated circuit is configured to change an upper limit constraint of a number of stages of multi-stage injection when the boost controller determines that the boost capacitor has deteriorated.

9. The injection control device of claim 1 further comprising:
a control integrated circuit comprising the boost controller and the boost voltage monitoring circuit:
wherein the control integrated circuit is configured to change an upper limit constraint of an engine speed when the boost controller determines that the boost capacitor has deteriorated.

10. The injection control device of claim 1 further comprising:
a control integrated circuit comprising the boost controller and the boost voltage monitoring circuit:
wherein the control integrated circuit is configured to change the predetermined number of times when the boost controller determines that the boost capacitor has deteriorated.

11. A device comprising:
a processor; and
a non-transitory computer-readable memory,
wherein the device is configured to:
control a boost switch in a boost circuit;
measure a boost current in a current detection resistor;
generate a boost voltage;
generate a first filtered boost voltage using a first low pass filter;
increment a jump counter;
determine that the first filtered boost voltage is less than or equal to a start boost voltage;
start boosting;
determine that the boost voltage is greater than or equal to a jump determination threshold voltage;
increment the jump counter;
continue boosting;
determine that the first filtered boost voltage is greater than or equal to a stop boost voltage;
stop boosting;
determine that the jump counter is greater than or equal to a deterioration determination threshold;
determine that a boost capacitor has deteriorated; and
perform at least one measure to reduce future deterioration of the boost capacitor.

12. A device comprising:
a processor; and
a non-transitory computer-readable memory,
wherein the device is configured to:
control a boost switch in a boost circuit;
measure a boost current in a current detection resistor;
generate a boost voltage;
generate a first filtered boost voltage using a first low pass filter;
increment a jump counter;
generate a second filtered boost voltage using a second low pass filter, wherein the second low pass filter is not identical to the first low pass filter;
determine that the first filtered boost voltage is less than or equal to a start boost voltage;
start boosting;
determine that the second filtered boost voltage is greater than or equal to a jump determination threshold voltage;
increment the jump counter;
continue boosting;
determine that the first filtered boost voltage is greater than or equal to a stop boost voltage;
stop boosting;
determine that the jump counter is greater than or equal to a deterioration determination threshold;
determine that a boost capacitor has deteriorated; and
perform at least one measure to reduce future deterioration of the boost capacitor.

13. The device of claim 11, wherein the device is further configured to:
determine whether to stop boosting based at least partly upon: (i) a first comparator configured to compare the first filtered boost voltage against a stop boost voltage and to output a first comparator result, (ii) a second comparator configured to compare the first filtered boost voltage against the start boost voltage and to output a second comparator result, and (iii) a latch configured to receive the first comparator result and to receive the second comparator result.

14. The device of claim 13, wherein the at least one measure includes decreasing a peak current.

\* \* \* \* \*